(12) United States Patent
Roulland et al.

(10) Patent No.: US 8,775,932 B2
(45) Date of Patent: Jul. 8, 2014

(54) GUIDED NATURAL LANGUAGE INTERFACE FOR PRINT PROOFING

(75) Inventors: Frederic Roulland, Le Versoud (FR); Jutta K. Willamowski, Grenoble (FR); David B. Martin, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 12/473,471

(22) Filed: May 28, 2009

(65) Prior Publication Data
US 2010/0306645 A1 Dec. 2, 2010

(51) Int. Cl.
G06F 17/27 (2006.01)
G06F 3/12 (2006.01)
G06F 17/30 (2006.01)
G06F 17/15 (2006.01)

(52) U.S. Cl.
CPC ........ G06F 3/1208 (2013.01); G06F 17/30654 (2013.01)
USPC ........... 715/275; 715/221; 715/224; 715/226; 715/230; 715/233; 715/273; 715/705; 715/707; 715/709; 348/581; 348/589; 348/590

(58) Field of Classification Search
CPC .................................................. G06F 3/1208
USPC ......... 715/221, 224, 226, 230, 233, 273, 275, 715/705, 707–709; 348/581, 589, 590
See application file for complete search history.

(56) References Cited

U.S. PATENT DOCUMENTS

| | | | |
|---|---|---|---|
| 6,275,791 B1 * | 8/2001 | Weise | 704/9 |
| 6,622,123 B1 | 9/2003 | Chanod et al. | |
| 2003/0084115 A1 * | 5/2003 | Wood et al. | 709/217 |
| 2003/0184557 A1 * | 10/2003 | Wen | 345/590 |
| 2004/0034520 A1 * | 2/2004 | Langkilde-Geary et al. | 704/1 |
| 2006/0053096 A1 * | 3/2006 | Subramanian et al. | 707/3 |
| 2007/0008557 A1 | 1/2007 | Harrington et al. | |
| 2007/0008558 A1 | 1/2007 | Rumph et al. | |
| 2007/0008559 A1 | 1/2007 | Rich et al. | |
| 2007/0008560 A1 | 1/2007 | Eschbach | |
| 2007/0109569 A1 | 5/2007 | Eschbach et al. | |
| 2008/0003547 A1 * | 1/2008 | Woolfe et al. | 434/98 |

(Continued)

OTHER PUBLICATIONS

Brun, et al., Document Structure and Multilingual Authoring, *Proc. of the 1st Intl. Conf. on Natural Language Generation*; vol. 14, pp. 24-31, Mitzpe Ramon, Israel, Jun. 12-16, 2000.

(Continued)

*Primary Examiner* — Stephen Hong
*Assistant Examiner* — Wilson Tsui
(74) *Attorney, Agent, or Firm* — Fay Sharpe LLP

(57) ABSTRACT

A guided natural language interface, a method for guiding a user in specifying a color problem with a document image, and a set of templates for use in the interface and method are provided. The interface includes computer readable memory which stores a set of issue description templates, each template being configured for guiding a user in formulating a problem statement characterizing, in natural language, a problem related to color identified in an input document. A natural rendering engine receives information input by a user and/or information input from an associated problem detector, and instantiates one of the templates in response thereto. The natural language rendering engine is configured for presenting the problem statement to the user as it is refined and communicating information based on the refined problem statement to an associated problem corrector.

27 Claims, 10 Drawing Sheets

(56) References Cited

U.S. PATENT DOCUMENTS

| | | | |
|---|---|---|---|
| 2008/0007749 | A1 | 1/2008 | Woolfe |
| 2008/0068626 | A1 | 3/2008 | Bala et al. |
| 2008/0079964 | A1 | 4/2008 | Woolfe et al. |
| 2008/0137914 | A1 | 6/2008 | Minhas |
| 2008/0143738 | A1 | 6/2008 | Woolfe et al. |
| 2008/0204829 | A1 | 8/2008 | Harrington |
| 2008/0278744 | A1 | 11/2008 | Marchesotti et al. |
| 2009/0073465 | A1 | 3/2009 | Rolleston et al. |
| 2009/0092325 | A1* | 4/2009 | Brown Elliott et al. ...... 382/232 |
| 2010/0304342 | A1* | 12/2010 | Zilber .......................... 434/157 |

OTHER PUBLICATIONS

LaPalme, et al., MDA-XML : une expérience de rédaction controlee multilingue basée sur XML, *TALN 2003*, Batz-sur-Mer, Jun. 11-14, 2003 ("XML Based Multilingual Authoring").

Martin, et al., Color It's just a Constant Problem; An Examination of Practice, Infrastructure and Workflow in Colour Printing, In *Proc. of Coop 2008*, Carry-le-Rouet (France) May 20-23, 2008.

Owda, et al., Conversation-Based Natural Language Interface to Relational Databases, *Intl. Conferences on Web Intelligence and Intelligent Agent Technology*, 2007.

PureDepth™, *PureDepth™ Multi-Layer Display*, available at: http://www.puredepth.com/, downloaded Apr. 14, 2009.

Reiter, et al., Building Applied Natural Language Generation Systems, *Cambridge University Press, Natural Language Engineering*, 1(1):000-000, 1995.

Woolfe, et al., Natural Language Color Editing, *Proc. XIG Conf.*, pp. 122-125, 2006.

U.S. Appl. No. 12/138,846, filed Jun. 13, 2008, Roulland, et al.
U.S. Appl. No. 12/464,212, filed May 12, 2009, Rolleston, et al.

\* cited by examiner

GUIDED NATURAL LANGUAGE INTERFACE FOR PRINT PROOFING

CROSS REFERENCE TO RELATED PATENTS AND APPLICATIONS

The following co-pending applications, the disclosures of which are incorporated herein in their entireties by reference, are mentioned:

U.S. patent application Ser. No. 12/138,846, filed Jun. 13, 2008, entitled "Print Mediator", by Frederic Roulland, et al.

U.S. patent application Ser. No. 12/464,212, filed May 12, 2009, entitled "Color Management System and Method using Natural Language Description of Color Differences", by Robert J. Rolleston, et al.

BACKGROUND

The exemplary embodiment relates to the field of digital image processing. It finds particular application in connection with a natural language interface which allows a user to interact with a color management system, and will be described with particular reference thereto.

One of the goals of digital color management technology is to preserve the customer's perceptual intent when color documents are rendered on different devices, such as RGB displays and color printers. One problem is that the color gamut and emulation profiles of the printer limit the range of colors which can be printed and how colors will be converted from one specification system to another. In some cases, the customer and printer may make coordinated use of the International Color Consortium (ICC) color profiling protocols. The ICC protocols are meant to ensure that color is rendered consistently across all devices. However, adherence to the protocols requires specialized color management knowledge and expertise. The document initiator/designer often provides reasons to the printer about problems with colors in somewhat ambiguous terms, such as "the logo is too blue." The printer manipulating document color therefore does so without clear knowledge of the customer's intent. In practice, several print-proof-adjust-reprint iterations may be required in the design-print workflow in order to produce an output acceptable for the customer. Clearly this has cost implications, particularly for emergent ready-to-print and print-on-demand markets.

The issue of lack of communication of the document intent (i.e. requirements, preferences, tolerances etc.) to a print shop by the document designer and reciprocally of the printer capabilities and constraints to the designer, has been addressed in above-mentioned application Ser. No. 12/138,846 by the provision of a print mediator which serves as an interface between the designer and the print shop operator.

The exemplary embodiment assists users in understanding and interacting with color management technology, such as the ICC protocols, which are embedded in devices and software in the design-print workflow.

INCORPORATION BY REFERENCE

The following references, the disclosures of which are incorporated in their entireties by reference, are mentioned:

U.S. Pub. No. 2008/0007749, published Jan. 10, 2008, entitled NATURAL LANGUAGE COLOR COMMUNICATION AND SYSTEM INTERFACE, by Geoffrey J. Woolfe, discloses a natural language color control system. The system includes a dictionary of ordinary language color terms, and a working color space. Every portion of the working color space is mapped to at least one term in the color term dictionary. An ordinary language command lexicon and syntax are provided for use with the ordinary language color terms that correspond to transformations in the working color space.

U.S. Pub. No. 2009/0073465, published Mar. 19, 2009, entitled NATURAL LANGUAGE COLOR COMMUNICATION AND SYSTEM INTERFACE, by Rolleston, et al., discloses a method and system for controlling color output. The method includes receiving a document containing a color image, producing a first output copy of the document using a first color processing path, receiving at least one natural language request to adjust the color output of the device, adjusting the color output of the device, and producing a second output copy of the document. The method and system further includes presenting natural language descriptions of the effects of color processing paths with or without sample palettes to the user either to solicit a suggestion from the user or present the user with choices based upon the natural language request received.

The following references, relate generally to color proofing and pre-press color management methods: U.S. Pub. No. 2008/0278744, published Nov. 13, 2008, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.; U.S. Pub. No. 2008/0143738, published Jun. 19, 2008, entitled A METHOD AND SYSTEM TO DETERMINE PREFERRED COLOR MANAGEMENT SETTINGS FOR PRINTING DOCUMENTS, by Woolfe, et al.; U.S. Pub. No. 2008/0137914, published Jun. 12, 2008, entitled PRINTER JOB VISUALIZATION, by Rajinderjeet Minhas; U.S. Pub. No. 2008/0204829, published Aug. 28, 2008, entitled HARD COPY OUT OF GAMUT DETECTION, by Patrick R. Harrington; U.S. Pub. No. 2008/0079964, published Apr. 3, 2008, entitled CRITICAL COLOR TOLERANCE GUIDE FOR PRINTERS, by Woolfe, et al.; U.S. Pub. No. 2008/0068626, published Mar. 20, 2008, entitled COLOR IMAGE GAMUT ENHANCEMENT PRESERVING SPATIAL VARIATION, by Bala, et al.; U.S. Pub. No. 2007/0008557, published Jan. 11, 2007, entitled METHOD FOR REMOTE PROOFING OF DFE COLOR ARCHITECTURE, by Harrington, et al.; U.S. Pub. No. 2007/0008558, published Jan. 11, 2007, entitled METHOD FOR PREPRESS-TIME COLOR MATCH VERIFICATION AND CORRECTION, by Rumph, et al.; U.S. Pub. No. 2007/0008559, published Jan. 11, 2007, entitled METHOD FOR PREPRESS-TIME COLOR MATCH VERIFICATION AND CORRECTION, by Rich, et al.; U.S. Pub. No. 2007/0008560, published Jan. 11, 2007, entitled METHOD FOR PREPRESS-TIME COLOR MATCH VERIFICATION AND CORRECTION, by Eschbach; and U.S. Pub. No. 2007/0109569, published May 17, 2007, entitled DETERMINING THE COLOR MATCH BETWEEN IMAGE DATA AND GRAPHICS OBJECTS, by Eschbach, et al.

BRIEF DESCRIPTION

In accordance with one aspect of the exemplary embodiment, a guided natural language interface includes computer readable memory which stores a set of issue description templates, each template being configured for guiding a user in formulating a problem statement characterizing, in natural language, a problem related to color identified in an input document. The interface also includes a natural language rendering engine, executed by a processor, which receives information input by at least one of a user and an associated problem detector, and instantiates one of the templates in response thereto. The natural language rendering engine is configured for presenting the problem statement to the user as it is refined by the template in accordance with user inputs and communicating information based on the refined problem statement to an associated problem corrector.

In accordance with another aspect, a color management method includes storing a plurality of issue description templates in computer memory, each template being configured for guiding a user in formulating a problem statement characterizing, in natural language, a problem related to color identified in an input document, each of the templates including an issue description related to a different problem, the issue description including an ordered arrangement of nodes including field nodes corresponding to a plurality of fields, at least some of which are fillable by a user, and production and morphological rules, the production rules modeling how the values of nodes influence other nodes for propagating features of filled fields of the issue description to one or more other fields of the issue description, the morphological rules each describing a syntactic relationship between at least two of the nodes. An input document is received and one of the templates is instantiated, based on information from at least one of an associated detector and a user concerning a problem related to color identified in the input document. A problem statement is iteratively refined, including presenting at least one of the fillable fields to a user and integrating user selected content of the filled fields, applying the production rules, and applying the morphological rules, thereby generating a refined problem statement in natural language form. The method further includes determining a correction to be applied to the image based on the refined problem statement.

In accordance with another aspect, a plurality of templates stored in computer readable memory, each of the templates configured for guiding a user in formulating a problem statement characterizing, in natural language, a problem related to color identified in an input document. Each template includes an issue description related to a different problem, the issue description comprising an ordered arrangement of nodes including field nodes corresponding to a plurality of fields, at least some of the field nodes being fillable based on user-selected content and at least some of the fields being fillable based on information provided by an associated detector, text nodes which support the generation of syntactically correct text strings in the problem statement, in which text content of the text node is filled or modified in response to features of other nodes, and optionally, fragment nodes which contains a list of child nodes selected from the field nodes, the text nodes, and optionally other fragment nodes. The issue description further includes production rules which each model how a value of one of the nodes influences at least one other of the nodes and morphological rules, each describing a syntactic relationship between at least two of the nodes.

DETAILED DESCRIPTION

Figure 1:
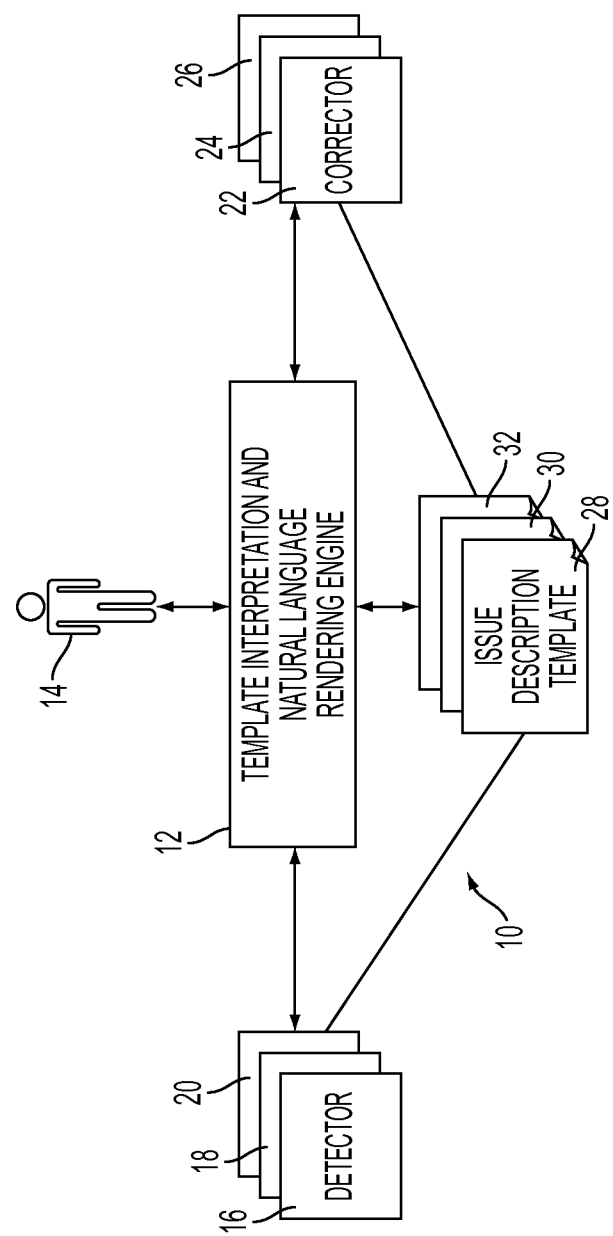
FIG. 1 schematically illustrates communication between a user and a guided natural language interface in accordance with one aspect of the exemplary embodiment.

Aspects of the exemplary embodiment relate to a guided natural language interface for facilitating the use of problem detection and correction tools in a color management system, to a print network incorporating the natural language interface and to a method of guiding the specification of a rendering problem and its correction.

The exemplary natural language interface ("interface") includes a plurality of different templates (referred to herein as template models). Each template provides rules for specifying a problem on a print job to be rendered and how it should be addressed. The guided natural language interface acts as a mediation layer between the user (who may be a designer of the document or a print job operator) and problem detection and correction software components. The interface is described in the context of managing and assessing color when submitting documents to a print shop or in pre-press, to provide a designer with a guided natural language interface that will simplify the use of color management tools and help the designers to improve the quality of their submission. For example, the interface finds application in connection with a print mediator, as described in co-pending application Ser. No. 12/138,846, the disclosure of which is incorporated herein in its entirety by reference. However, it is also applicable to a user printing the user's own documents. The '846 application provides a system which facilitates better communication between designer and print shop as well as being a platform for supporting problem detection and correction via various color management tools.

The exemplary apparatus and method allow users with a variety of levels of expertise to use color management detection and correction tools successfully and to communicate effectively with the print shop by providing an interface that is specifically designed to assist different types of users with different levels of expertise and perspectives in using such tools. In particular, the exemplary user interface guides users in recording their preferences in an understandable way that is actionable by the other parties in the exchange, and to be guided to choose the right correction for their needs. The interface is particularly useful in situations where files have not been color managed according to ICC protocols up to submission and practitioners are not using calibrated screens. The exemplary system and method facilitate the use of problem detection and correction tools in the domain of visual content, for example for color appearance issues, where a guided natural language interface created in a generic way adapts the use of these tools to the level of expertise of the users. The exemplary guided natural language interface acts as a mediation layer between its users, such as document designers, and the underlying color management infrastructure.

The guided natural language interface described herein may be an integral part of a set of technologies aimed at reducing the number of cycles and the time spent between the submission of a print job to a print shop and the production of a printout that meets the submitter's expectations, focusing in particular on color problems that often constitute the reason for these numerous iterations.

The word "color" is used to refer to any aspect of color which may be specified, including, but not limited to, absolute color values, such as hue, chroma, and lightness, and relative color values, such as differences in hue, chroma, and lightness.

A "print job" or "document" is normally a set of related sheets, usually one or more collated copy sets copied from a set of original print job sheets or electronic document page images, from a particular submitter, or otherwise related. The print job may include or be associated with a job ticket which includes submitter information and other information on the job type as well as providing printing instructions.

A "color profile" is a mathematical transform that characterizes the way in which the specific color rendering space of a device or of a standard color space is converted into a device independent color space. A source color profile is applied to the color values of a digital document in order to translate them into a device independent color space. An output color profile is applied to the device-independent color values of a digital document in order to translate them into color values meaningful for the corresponding output device, such as a printer or display device.

The exemplary embodiment allows full use of color management technologies and print queue information to provide assessment of non-color managed documents for potential problems or discrepancies in color should they be printed. This may include comparative soft proofing, detection of possible color problems, and natural language descriptions of major color changes with the added benefit of the exemplary method and system for making these available in a guided interface.

The "output color space" characterizes the possible colors of a given output device. Colors which cannot be reproduced with a predetermined accuracy are considered to be out-of-gamut for the output device. In general, display devices have a gamut which covers a different range of colors than a printer. For a printer, the set of colors in the output color space is a function of the colorants available in the output device as well as on the level of coverage of the substrate which can be achieved.

The output device (e.g., printer) may further be provided with one or more emulation modes. An emulation mode is a color profile that does not characterize the output device but instead characterizes the color space of another type of device or a standard color space. Each emulation mode performs a mapping between color values of the colors of an input image and corresponding color values for the particular emulation mode before the color transform corresponding to the device profile is applied. The set of available colors in a particular emulation mode constitutes the "emulation space". Each emulation mode, where more than one mode is available, applies slightly different algorithms for matching input colors to color values within its color space. Because the different emulation modes typically have different color gamuts, a color which is out-of-gamut for purposes of one emulation mode may be within gamut for another emulation mode. Exemplary emulation modes include SWOP (Specifications for Web Offset Publications), FOGRA, GRACOL, ISO-Coated, Euroscale, Japan CMYK, and the like. While the colors provided by the color profile of the particular emulation mode generally fall within the printer's gamut, a portion of the colors may be outside the printer's gamut. Thus, only those colors which fall within the volume represented by the intersection of the selected emulation mode's gamut and the gamut of the printer are accurately rendered. Other colors may be considered out-of-gamut for the printer in the particular emulation mode selected.

With reference to FIG. 1, a guided natural language interface 10 includes a template interpretation and natural language rendering engine (hereinafter, rendering engine) 12, which controls the information exchange between a user 14 and a set of problem detectors 16, 18, 20, and correctors 22, 24, 26. A set of pre-defined issue description templates 28, 30, 32 specify the interaction for each of a plurality of types of problem related to the visual content of the image and between the user and the corresponding detectors 16, 18, 20 and correctors 22, 24, 26. Each template addresses a different type of problem commonly found in image rendering and is configured for guiding a user in formulating a problem statement (problem description) which expresses, in natural language, a perceived problem with a document to be printed. The problem description is thus the surface form of the underlying issue description. The templates 28, 30, 32 are stored as template models which become template instances when applied to a specific document. While three of each of the detectors, correctors, and templates are illustrated, it is to be appreciated that any number of these components may be employed. Each detector may be associated with a respective template, or a template may be associated with more than one detector, or vice versa.

Figure 2:
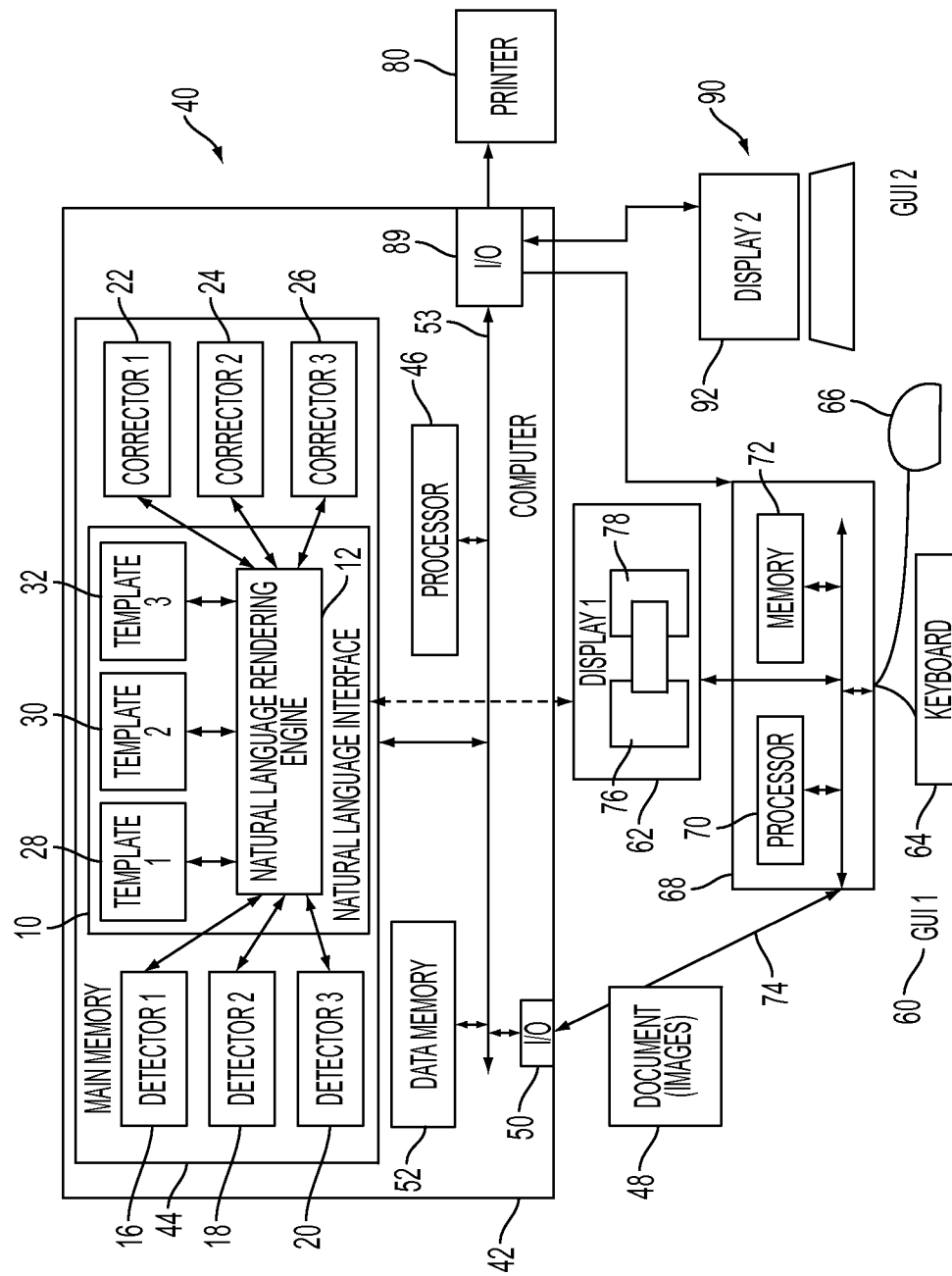
FIG. 2 is a schematic diagram of one embodiment of a color management system which incorporates the exemplary guided natural language interface of FIG. 1.

FIG. 2 illustrates one exemplary embodiment of a color management system 40, which incorporates the guided user interface 10. The guided user interface is hosted by a computer 42, such as a desktop computer, laptop computer, portable digital assistant, remote server computer, or the like. The computer may be a general purpose computer or specifically adapted to performing the exemplary method described below with reference to FIG. 4. In the exemplary embodiment, the guided user interface 10 is hosted by a server computer 42 which is accessed by the user via a web portal. However, in other embodiments, the interface 10 is wholly or partly hosted by the user's own computer. The computer 42 includes main memory 44, which stores the natural language rendering engine 12 as well as detectors 16, 18, 20 and correctors 22, 24, 26. Each of these components may be in the form of software, hardware or a combination thereof. In the exemplary embodiment, the components 12, 16, 18, 20, 22, 24, 26 are in the form of software which is executed by an associated processor (or processors) 46, such as the computer's CPU. A digital document image 48 may be input to the computer 42 via an interface connection 50 and temporarily stored in data memory 52, such as volatile memory, which may be the same or separate from memory 44. Components 44, 46, 50 of the system, may be connected by a data/control bus 53.

The memory 44, 52 may represent any type of computer readable medium such as random access memory (RAM), read only memory (ROM), magnetic disk or tape, optical disk, flash memory, or holographic memory. In one embodiment, the memory 52 comprises a combination of random access memory and read only memory.

Figure 3:
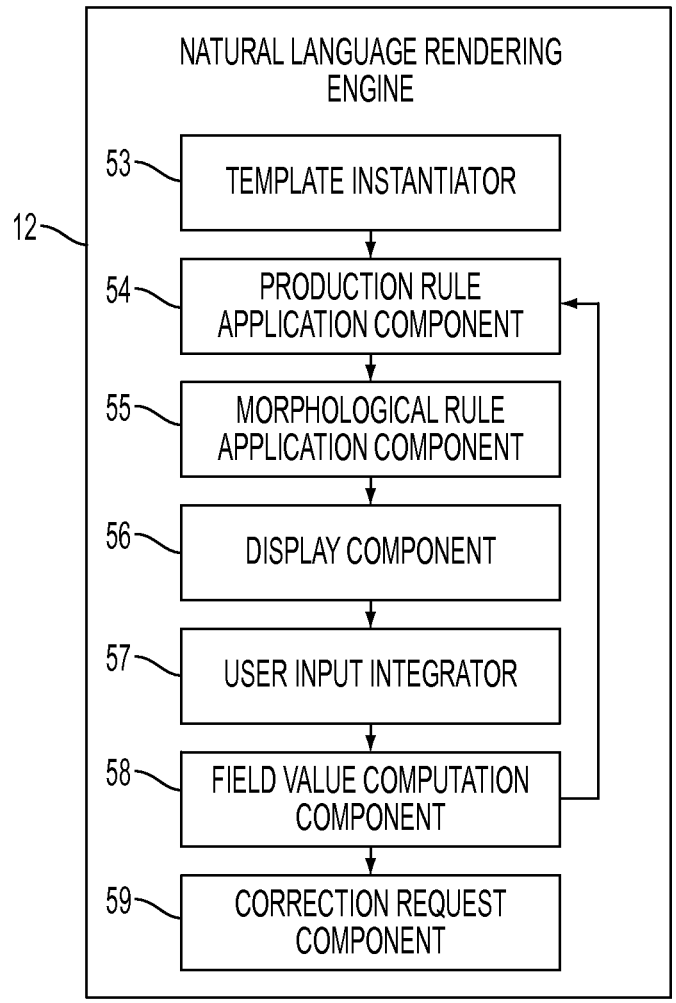
FIG. 3 illustrates an exemplary natural language rendering engine suitable for use in the system of FIG. 2.

As illustrated in FIG. 3, the rendering engine 12 may include various software components, executable by processor 46, whose function is best understood with reference to the method described below. These components may include a template instantiation component 53, a production rule application component 54, a morphological rule application component 55, a display component 56, a user input integration component 57, a field value computation component 58, and a correction request component 59.

Returning to FIG. 2, the natural language interface 10 communicates with the user via a graphical user interface (GUI) 60 which may include a visual display 62, such as an LCD screen or monitor, and a user input device 64, 66, such as an alphanumeric keyboard, keypad, touch screen, cursor control device, or combination thereof. The exemplary GUI 60 is hosted by a user's workstation computer 68, having its own processor 70 and memory 72. The workstation is located remote from the server computer and linked thereto by a link 74, such as a wired or wireless link, e.g., the Internet. However, it is to be appreciated that in other embodiments, the display 62 and user input device(s) 64, 66, may be directly linked to the computer 42 hosting the interface 10.

The interface 10 causes the GUI 60 to display the digital document image 48 or a representation 76 of all or a portion thereof. In the exemplary embodiment, the GUI 60 is configured for displaying side by side image representations 76, 78. For example, GUI 60 may receive a request from the user 14 to compare colors in two different versions of the same document. The GUI may thus display a first digital version 76, such as an original document 48 to be submitted for printing, or portion thereof, and a second digital version 78 of what the printed document, or portion thereof, is expected to look like when rendered. This second image 78 may be created based on the color profile and emulation mode gamut of a specific printer 80 (e.g., a printer selected for printing or a default printing apparatus). For example, the interface 10 may receive input from the printer 80 via a print mediator (not shown), as described in co-pending application Ser. No. 12/138,846. However, as discussed in detail below, the embodiments disclosed herein are not limited to printing applications.

In operation, when the two versions 76, 78 of the document are predicted to differ substantially, problematic areas may be automatically annotated and/or highlighted. For example, in the screenshot 82 of the user's display 62, shown in FIG. 5, a region 84 of the submitted document representation 76, where the identified problem occurs, is highlighted, e.g., with a border 86 of a contrasting color. A corresponding region 88 of the output document representation 78 may also be highlighted to demonstrate the problem. Additionally or alternatively, the color of the region 84 (and/or 88) may be modified to emphasize the problem.

As shown in FIG. 2, the exemplary interface 10 is also configured for communicating information gained through the guided interaction with the user to a print shop operator, e.g., via an input/output device 89 communicatively linked to a second remote GUI 90 located at the print shop which includes its own display 92.

The rendering engine 12 is configured for receiving input from the detectors 16, 18, 20 (and/or from the user) concerning visual content problems, such as color differences between the input image 48, 76 and rendered image 78, and calling up an appropriate one or more of the templates from the set of stored templates 28, 30, 32 which guides the user in specifying the problem and/or how it should be corrected.

The guided user interaction through the interface 10 which leads to a completed problem description can be described as follows: The interface 10 is capable of combining automatic detector input and guided user input to characterize a problem. It is also able automatically to propose appropriate correction options based on the characterization of the problem. It is also able to collect additional user input to select and control an appropriate correction tool.

In particular, the guided natural language interface 10 presents data from problem detectors 16, 18, 20 that operate on a document 48 in a manner that disambiguates complex features of the detection so they are functionally understandable to the user. Additionally, the interface 10 guides the user through a series of selections and refinements that allow the user to classify and record the issue and choose an appropriate problem corrector. The mediation from technical complexity to something that can trigger a useful correction operation for the user, through natural language guidance at the interface, is an advantage over existing softproofing systems.

Figure 5:
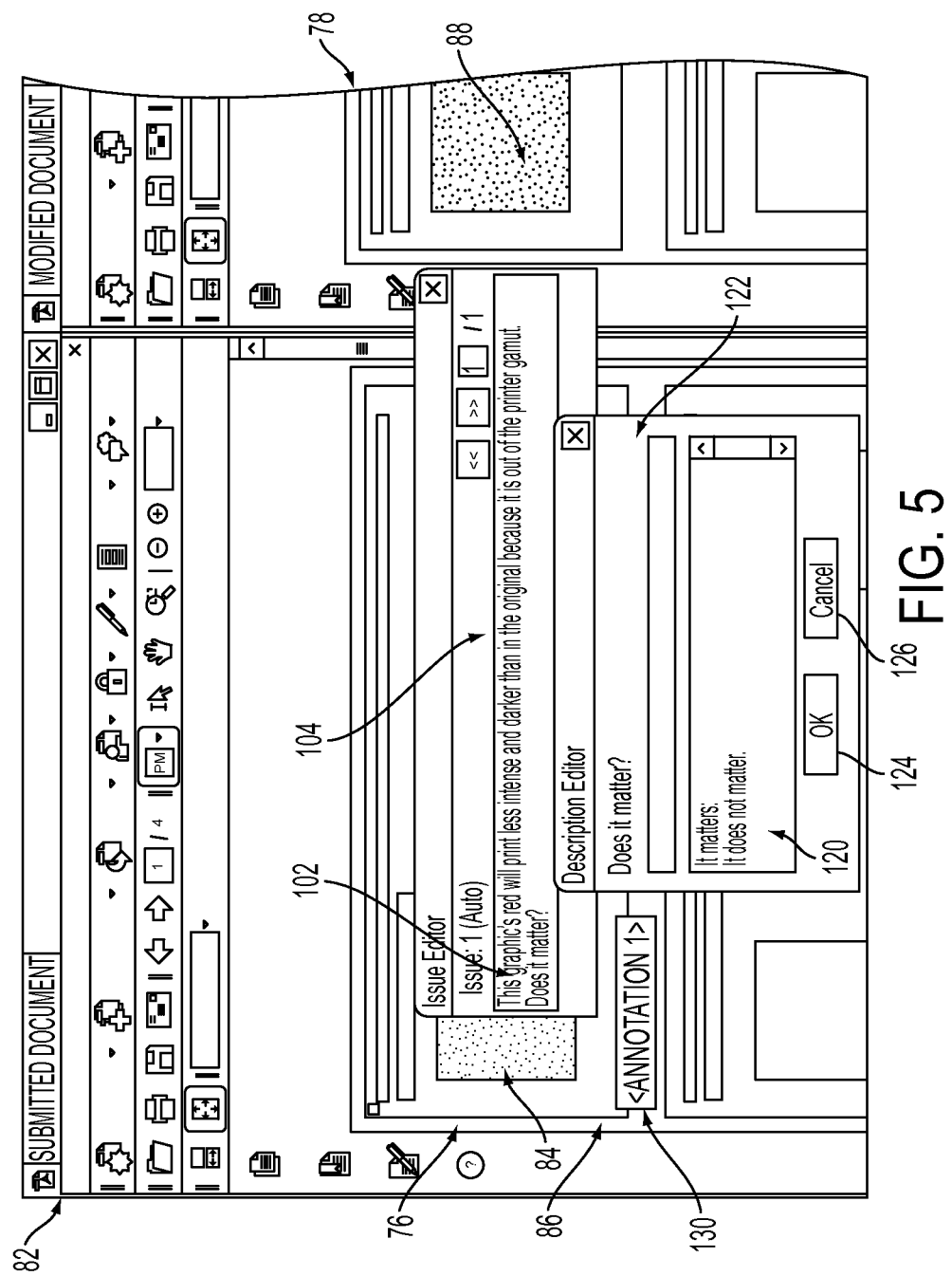
FIG. 5 illustrates a screenshot of an exemplary interface display presented to a user.
Figure 6:
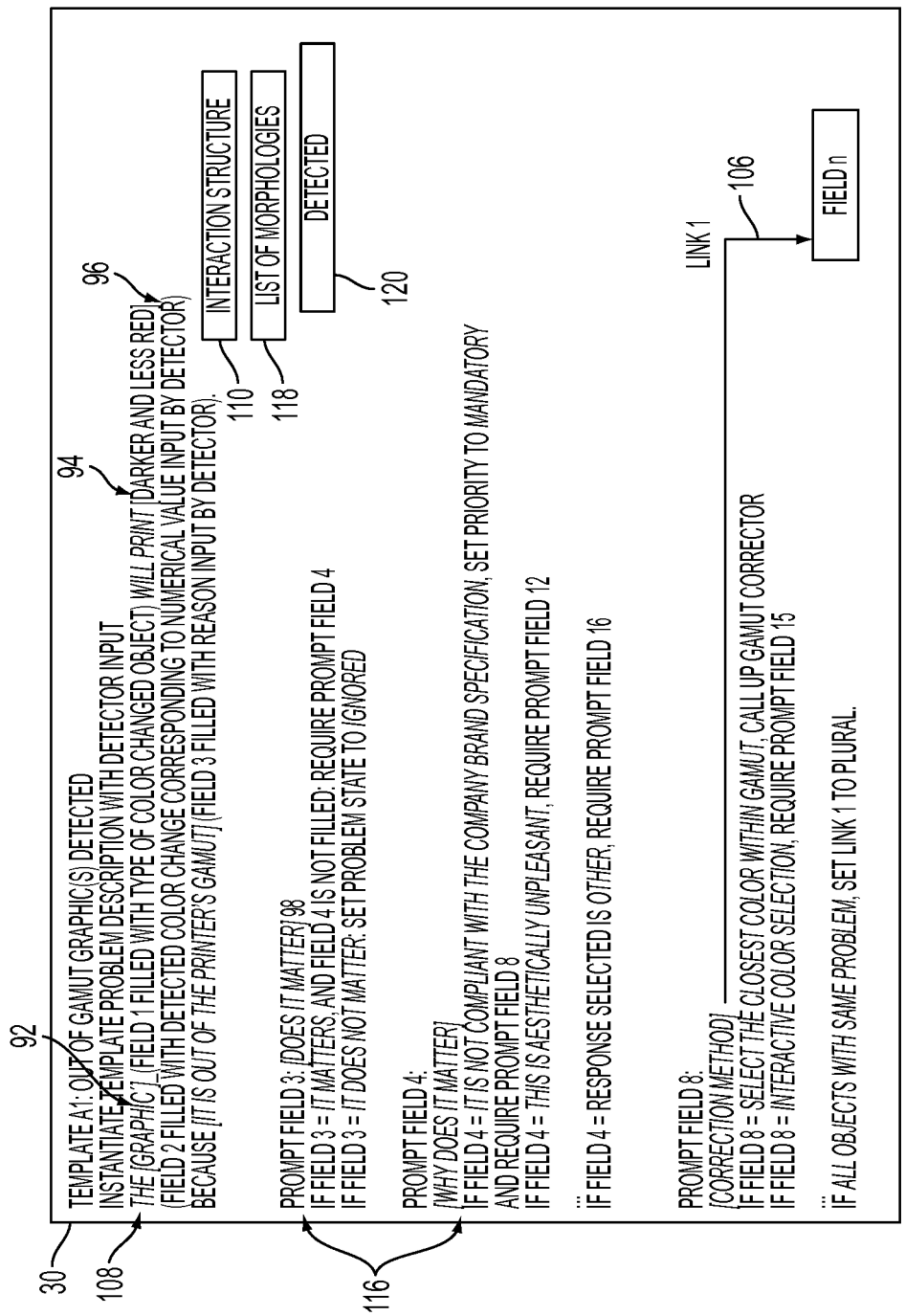
FIG. 6 illustrates an exemplary template in pseudo code.
Figure 7:
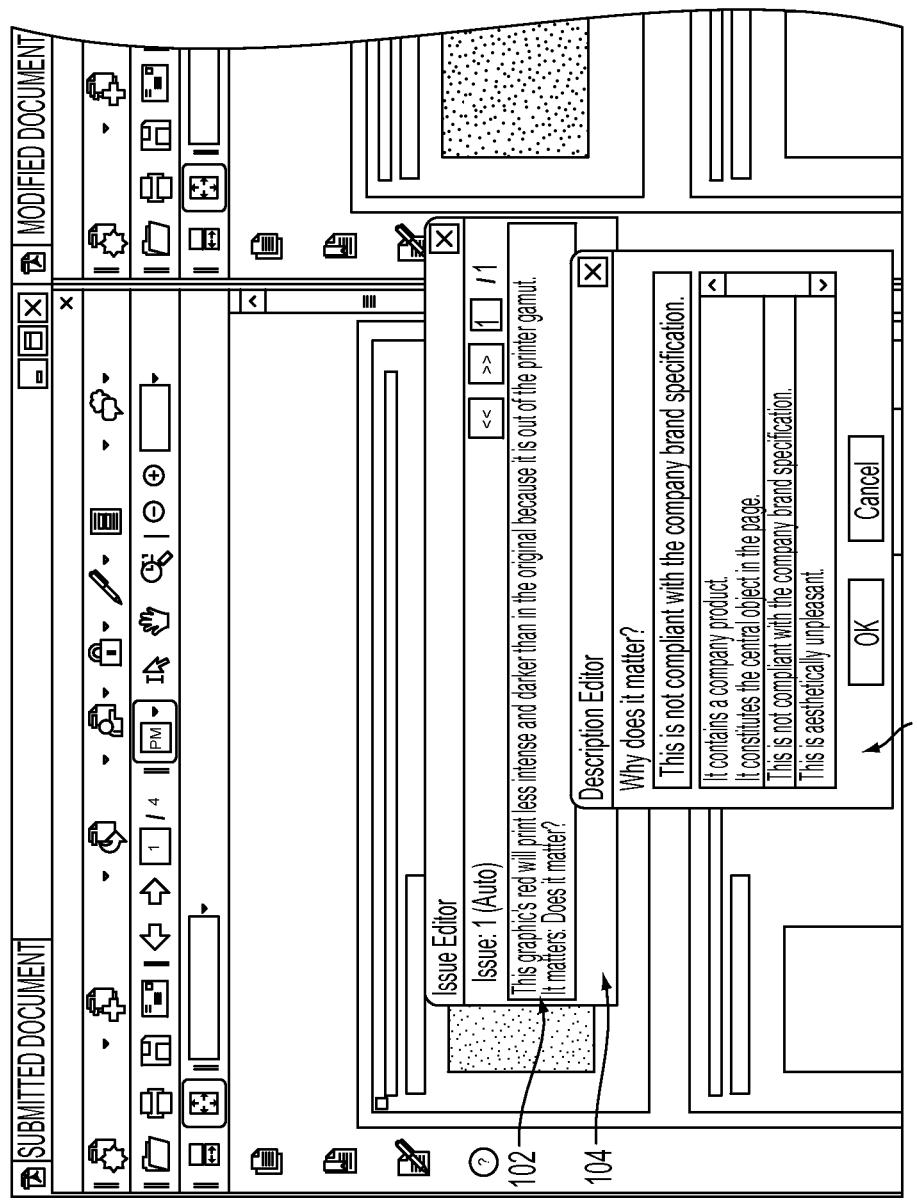
FIG. 7 illustrates another screenshot of the exemplary interface display presented to a user.

As previously noted, the template interpretation and natural language rendering engine 12 controls the exchange of information between a set of detectors, a set of correctors, and the user 14. The rendering engine 12 uses one or more of the set of predefined problem specific templates to drive this interaction. As illustrated with a pseudo-code example of a template 30 in FIG. 6, each template 28, 30, 32 includes a plurality of fillable fields 94, 96, 98, 100, etc. which are appropriate, in combination, to defining a detected problem and whether and if so how it should be corrected by one or more of the correctors 22, 24, 26. The natural language rendering engine 12 generates a natural language text string 102 (FIG. 5) (such as a sentence or paragraph) based on the filled fields which regularizes expressions to form a more grammatically coherent text string. As shown in FIG. 5, the natural language text string 102, which is modified as the interactive session progresses, may be displayed on the user's screen in a drop down issue editor box 104, or otherwise displayed or output through a speaker (not shown) via a voice synthesizer. At least some of the fields are linked to other fields (illustrated in FIG. 6 by link 106) such that natural language grammar rules applicable to the content of a filled field are propagated to other fields. For example, if a filled field refers to plural objects rather than a single object, grammar requirements for plural objects are propagated so that other parts of speech are made consistent in the content of other filled fields, such a verb forms (e.g., are vs. is), indefinite article (a vs. some, any, etc), definite article (e.g., in French, les vs. le or la). As well as propagating the effects of plural vs. singular, other grammar rules which are different depending on the fillable content are also propagated. For example, an adjective or noun which has a vowel as its first letter is preceded by the indefinite article an rather than a in English. Gender is also considered in languages where the gender of an object affects the definite and/or indefinite article and associated verb, Exemplary gender features may be selected from a group which includes two or more of masculine, feminine, and neutral. Each of these rules may be stored in the template associated with respective selectable options for fillable content of each field. In this way, the engine 12 does not need to parse the text but simply to apply the linked rules.

The templates 28, 30, 32 for the natural language interface 10 can be built in a generic way, for each of the specific color management components that will then be interpreted by the system at runtime in order to manage the user interaction with these components. The method and guided natural language interface can also be adapted to the actual user's level of expertise in the problem domain in order to optimize the mediation process. For example in a color management context, a high level and easily understandable natural language interface 10 is provided to be used by non-technical users, such as document designers, while at the same time, the underlying information can be provided in a more detailed and technically expressed interface accessed by more technically knowledgeable users, such as print shop operators.

The detectors 16, 18, 20 and correctors 22, 24, 26 may be of the type described in co-pending application Ser. No. 12/138,846. For example, a first detector 16 may be provided for detecting mismatch between objects, where groups of objects that have the same (or very similar) color in the original document but a different color in the printed version. A corresponding corrector 22 may be provided for unifying the color for some or all of the concerned objects. Other detectors may be provided for detecting out of gamut spot colors and out of gamut image/graphics, with corresponding correctors for proposing in gamut colors. Another detector may detect when color profiles are missing. Missing color profiles may cause the output device (e.g., a printer) to use a default color profile that may be inappropriate. Such a detector may be associated with a corrector which proposes alternative color profiles. Yet another detector may detect that spot color definitions are different between the document specifications and those applied by the printer. A corresponding corrector may propose the choice of printing to match the designer swatchbook definition, or any other appropriate definition of the color. Above-mentioned U.S. Pub. Nos. 2007/0008558, 2007/0008559, and 2007/0008560 provide examples of correctors which may be utilized herein. The exemplary set of detectors 16, 18, 20 may include at least one, and generally at least two detectors selected from the above-described detectors.

application Ser. No. 12/138,846 provides an environment mediating between document designers and print shops which enables designers to review their submissions before sending them to the print shops, to identify problematic areas and even communicate some recommendations for corrections to the print shop operators and enables the integration of problem specific color problem detectors and correctors within the reviewing application to make these components accessible to the designer. The present natural language interface 10 provides a method for interfacing these detectors and correctors effectively with the users in such a system. However, it is to be appreciated that the natural language interface is not limited to use with a print mediator and finds application within other soft proofing environments.

The interaction between the detectors, correctors, user and interface is typically initiated by a detector but also can be from the user. For each detected problem, the corresponding predefined template is first instantiated. The problem description part of the template may be automatically filled by the problem detector. The template is then used to offer a guided natural language interaction to the user to complete the problem description and to potentially correct the corresponding problem. During this interaction the user is able to:

1. Visualize the description of the problem that was detected.
2. Help to refine the problem characterization.
3. Visualize correction options based on the characterized problem.
4. Select and specify options for the appropriate correction tool.

The interaction ends with sending the collected information to the selected corrector.

A more detailed description of the way a template may be structured and how the rendering engine supports the user interaction based on the template will now be described.

Template Model

Each template model 28, 30, 32 includes the issue description and the information required by the rendering engine 12 to manage the user interaction. It also contains the problem description, to the extent it has been formulated through the user interaction. The template model may be stored within a structured file, such as an XML file, and contains information about the content, the structure, and the logic of the elements relevant for the problem solving process and potentially displayed through the interface.

A template model may include some or all of the following parts: an issue description, one or a plurality of text nodes, a plurality of field nodes, one or more fragment nodes, one or more production rules, and one or more morphology rules.

1. Issue Description

The issue description 108 is the root element of the template and structures the whole space that can be explored during the interaction. It may be composed of the following sub-parts:

A. Interaction Structure 110: A tree that organizes the different elements (or nodes) of the issue description and provides for the determination of the appropriate natural language interface. The description root is specified by a Fragment node (as described below).

B. List of Rules 114: The rules control the evolution of the problem description content based on detectors' and users' input.

C. List of Morphologies 116: The morphologies specify the natural language surface forms used to display the template content to the user in formulating a problem statement.

D. State 118: The status of the issue. The possible state values depend on the application. In one embodiment, the issue may be in one of the following states: detected, open, ignored, solved (identified by a detector, confirmed by the user, ignored by the user, solved respectively).

2. Text Nodes

Each text node is a non-interactive textual element of the issue description supporting the generation of syntactically correct sentences at the user interface level. It can be defined by:

A: Name: Name (identifier) of the node.

B. Value: Value of the node. The value can either be a text constant or a morphology identifier (see below). The latter is the case whenever the surface value to display during user interaction depends on the node features and—more precisely on the features and values of the other description nodes. (e.g., This or These).

C. Features: current features of the node, e.g. number(plural), gender(female) allowing a determination of the appropriate surface form to display when interacting with the user. For example, when the feature is plural, the correct plural instance of the verb "to be" is selected (is vs. are), the indefinite article may be changed from "a" or "an" in the case of singular, to a zero article for plural, pronouns such as "its" may be changed to "their", and so forth. When a language uses different genders for objects, the definite or partitive article may be automatically changed to reflect a gender of a selected field option (e.g., in French, le, la, etc.). Thus, each of these changes may proceed automatically, by application of the rules, without the need of a syntactic component.

3. Field Nodes:

A field node is an element of the issue description that can evolve during the user interaction. A field value can be filled and modified (1) by a problem detector, (2) by the user, and (3) through a production rule. A field node can have some or all of the following attributes:

A. Name: Name (identifier) of the field.

B. HasMultipleValues: A Boolean, indicating if this field accepts only a single value or also multiple values.

C. Value(s): (List of) current field value(s). In the exemplary embodiment, a value—e.g., a current field value, an option, or a default value——always makes reference to a morphology identifier.

D. Options: List of acceptable values. Each option can have a score which provides for the proposition of the most pertinent options first. If the field is actionable (see below) each option can further be associated to a particular action to be executed when the option is selected.
E. Default Value(s): (List of) default value(s).
F. Query: A query interactively requesting the field value from the user (e.g., Why does it matter?).
G. IsOpen: A Boolean operator, indicating if the user can enter any free text as the value or if he can only select among the predefined options.
H. IsMandatory: A Boolean operator, indicating if the field must be filled to complete the problem solving process.
I. IsActionable: A Boolean operator, indicating if assigning a value to this field will launch an action.
J. IsAutomaticFillOnly: A Boolean operator, indicating that the field value is not editable by the user.
K. IsInternal: A Boolean operator, indicating a field that is not displayed to the user, but is only used internally e.g., to store values originating from the detectors or to be used by the correctors. Internal fields are dedicated to communicating with detectors and correctors while other fields allow user input to be obtained.
L. Features: a set of current node features, e.g. number (plural), gender (female). The node features dynamically determine the appropriate surface form for the node value and the options to propose during user interaction.

Each template generally includes several field nodes, such as at least two user-fillable field nodes, or at least three. In any problem specification process, fewer than all the user-fillable fields of these nodes may be utilized, depending on the options selected for other field nodes.

3. Fragment Nodes

Fragment nodes allow the recursive specification of the tree structure corresponding to an issue description. At the interface level, a fragment node typically represents a syntactic unit, such as a sentence, phrase, or other text string. An individual fragment node specifies the decomposition of a node within this description. It contains a list of child nodes of any kind (e.g., text node, field node, fragment node (for a smaller fragment), and combinations and multiples thereof, bearing in mind that at least one smaller fragment node does not itself include any fragment nodes). A fragment node can have some or all of the following attributes:
A. Name: Name (identifier) of the fragment.
B. List of elements: sequence of nodes (Text, Field and/or Fragment nodes) contained in the fragment.
C. Visible: A Boolean operator, specifying if this fragment should be displayed to the user. As the issue description is specified step by step, the individual fragments can unfold in a successive manner. Some fragments are only displayed (i.e., visible) to the user once some prior fragments are appropriately filled. For example, an issue should be specified at a higher level before characterizing it in detail.
D. Features: current features of the node, e.g., number (plural), gender(female) provide for the determination of the appropriate surface form for the node value and options when displaying it to the user.

4. Production Rule

A production rule models value dependencies between nodes. It defines how the values in the different fields influence the other nodes. A production rule may include:

A. A set of conditions each concerning the value of a specific source field:
  i. The presence/absence of a specific value within the field
B. A list of actions each corresponding to one of the following (not all actions may be available, depending on the type of dependent node (text, field, or fragment node):
  i. a change in the visibility of a target fragment (invisible to visible or vice versa), in the case of a fragment node;
  ii. a modification to the value or the default value of a target field (in the case of a field node);
  iii. an addition or removal of a user selectable option from/to a target field (in the case of a field node) When some fields' values are selected, this may allow a modification of the list of available options for related fields;
  iv. a setting of the score associated to a given option in a target field. Similarly some options available for other, related fields might become more or less likely. The set of available options will be re ranked accordingly;
  v. a setting of the state of the issue description (a change from one state to another, depending on how many states there are, e.g., from 'detected' to 'open' or from 'open' to 'ignored' or 'solved');
  vi. a specification of a complementary description field to present to the user. When some fields' values are selected, this may require another field to be filled immediately as a mandatory complement of the selected value. For example, a severity field set to high may have to be justified by a reason. The use of such action in a rule will ensure the user is automatically prompted for this complement.

5. Morphology Rule

A morphology rule describes the syntactic relationship between the nodes and is used to ensure that the problem description is kept grammatically correct while evolving. It defines how the features in the different nodes and description fields depend on each other. More precisely a morphology rule contains:

A. A list of feature propagation definitions each specifying: How a specific feature should be propagated from a source node to a target node, for instance if the subject in a node has a value with the feature number(plural), this feature is propagated to the corresponding verb.
B. A template instance (an instantiation of a template model) contains the actual description of a particular problem observed within a particular document. It contains the actual field values that are explicitly filled in by the problem detector or the user respectively. Template instances are associated as annotations to the problematic objects. They may be stored within the document and thus carried along with the document, e.g., when the document is submitted to the print shop.

Based on the same set of Field Nodes, different natural language versions can be generated, adapting the template's interaction structure. This allows for the provision of an interface in which natural language expressions and interaction guidance are adapted to different types of users or environments. Based on a "user type" input, the natural language system can thus present the information in the appropriate form (more or less detailed, at different levels of technical sophistication) and interact differently according to the expertise level of the user, or according to the set of detection/ correction tools available in his environment (additional and/ or more advanced color management tools may be available on the print shop side, for example).

Having described how a template and its instances can model the structure and the state of an issue description through the nodes and how it can model the dynamic aspects of this description through the rules, an example of how such a template may be used in practice during the problem specification and solving process is now described.

Problem Specification and Solving Process

The exemplary interface supports the successive specification of a problem leading from its detection to its correction. A method which makes use of a template as defined in previous section will now be described with reference to FIG. 3. The method can be divided in three main parts: the instantiation that is initiated by the user 14 and/or a detector component 16, 18, 20, the iterative refinement that is supported by the rendering engine 12, exploiting the template interaction structure, and the correction delegated to a corrector component 22, 24, 26.

The method begins at S100. At S102, templates 16, 18, 20 are generated based on the availability and types of detectors and correctors available, and stored in computer memory. At S104, an image 48 is input, e.g., by a user, prior to submission for printing, and stored in temporary computer memory 52. At S106, one or more detectors 16, 18, 20 operating on the input image 48 may provide input to the natural language interface 10. At S108, a user 14 may provide input to the natural language interface 10 regarding observed errors. The user may also select his level of expertise, e.g., from a drop down menu, such as basic, intermediate, or advanced, in response to a prompt by the interface.

The natural language interface 10 performs three basic steps: instantiation, iterative refinement, and correction. In the instantiation step, a template is selected (S110) which is appropriate to the detected errors (detected by the detector and/or user). In the iterative refinement step, production rules (S112) and morphology rules (S114) are applied. At S116, the natural language interface may display a prompt field 120 (e.g., in a description editor 124, as illustrated in FIG. 5, which the user may fill with a selected one of a set of selectable options or a value, as the case may be and confirm/decline the selection by actuating a displayed accept or reject button 126, 128. At the same time, the problem description 102, or that part of the problem description which the issue description makes visible based on the prior inputs, is displayed to the user via the user's display 62 (S118). The user input is integrated into the issue description (S120) and the method may return to S112 for the production rules and morphology rules to be applied, based on the field content, after which the updated problem statement is again displayed (S118) and a new prompt field is displayed at S116. The process iterates automatically in this way until all required prompt fields have been filled that are specified by the issue description and a full description of the problem has been generated. Alternatively, instead of presenting fields individually, the natural language system 10 may display a generic description which includes all or at least some of the fillable fields contemporaneously. As each field is filled, the natural language system integrates the user input and may refine the problem description 102 through an iterative process by applying steps S112, S114 and S118, until all the fillable fields are complete.

The third stage includes obtaining mandatory field values (comprehensible to the corrector) based on the content of the filled fields (S122) and inputting these into an appropriate one or more of the correctors 22, 24, 26 (S124). The correctors apply the corrections in conformity with the mandatory field values and output a corrected image, which may be displayed to the user as the modified document 78 (S126). The corrected image may be output to one or more of the designer's GUI 60, the printer 80 for printing, and the printshop operator, i.e., to be displayed on GUI 90 for the operator to review prior to printing (S128). The print shop operator uses the expert setting and thus is provided with a more technical expression (a slightly different version) of the problem statement than is seen by the user. The method ends at S130. Further details on the system and method now follow.

Instantiation (S110)

At runtime, a template 28, 30, 32 may be instantiated automatically, by a problem detector 16, 18, 20 or manually, by the user 14, via his GUI 60, when either of them detects a problematic area in the document. The problem detector may specify which template will be used. The template instantiator 53 of the rendering engine may instantiate the appropriate template. The problem description 102, which is the surface (displayed) form of the current issue description, is then partially filled in automatically using either the problem detector output or initial information actually or implicitly provided by the user. The user may have selected certain types of problematic elements 76 prior to instantiating the template which may provide for the automatic completion of appropriate corresponding fields in the template. The problem description 102 is then ready to be displayed to the user and iteratively refined.

Iterative Refinement (S112-S120)

The iterative refinement is controlled by the rendering engine 12. An iteration may include the following sequence:

1. The production rules are sequentially applied to the template instance (by the production rule application component 54) according to the completed field values: Values, options, scores or default values may be updated for particular template fields; the visibility of particular fragments can be adjusted; the state of the issue description can be modified (S112).

2. The morphology rules are applied (by the morphological rule application component 55) to propagate node features according to the current values (S114).

3. If a complementary field to be completed by the user has been identified by a production rule—the system will prompt the user for its value (S116).

4. When the user has filled all the prompted fields (input to the template by the user input integrator 57), the display component 56 of the system renders the current issue description as a problem description according to the template interaction structure (in natural language form) (S118) and the user decides which field to specify next.

5. Each time a field value is modified by the user (in 3 or 4) the system takes the appropriate action: if a value associated to a correction action has been selected and if all the mandatory fields have been filled, it switches to the Correction step (S122, S124). Otherwise it resets all template nodes that do not have explicitly set values to their initial state (the initial default values, options, etc.) and iterates again through the refinement step to further specify the problem description. Explicitly set values are values either initially completed by a detector or entered by the user that have not been altered through production rules.

Correction (S122, S124)

Once the detected problem has been sufficiently characterized, correction actions can be enacted through the issue description (S122) This occurs when a user has selected an actionable field value. Based on this selection (or after prompting the user for missing mandatory correction options based on the selection), the corresponding corrector 22, 24, 26 is instantiated and all the field values that were collected within the template instance are passed as input arguments to the corrector. The correction can then be applied to the document based on this input.

In one embodiment, the interaction with the user 14 can be suspended at any time. The instantiated template retains and stores the data entered at each step including all relevant information, i.e., all explicitly set field values. It is attached as an annotation 130 to the problematic objects 84 (FIG. 5) and at each step updated and stored within the document 48. This allows for the reactivation of suspended interactions at any time. It also allows, furthermore, the communication of the problem description between the different document reviewers in the printing process. For example, the document designer 14 can annotate the document to show intent (e.g., which are the most important areas of the document and why) and solve color problems prior to document submission and the print shop operator managing the printing process will have information that will help them understand the history of the document, whether the final product should meet expectations, and what sorts of aesthetic manipulations could be used to improve the quality of the document for the customer.

In the same way, the elaborated problem description 102 is stored after the correction is completed. Through reopening it via the rendering engine 12, this constitutes a detailed and contextualized natural language written history of the corrections performed.

Figure 4:
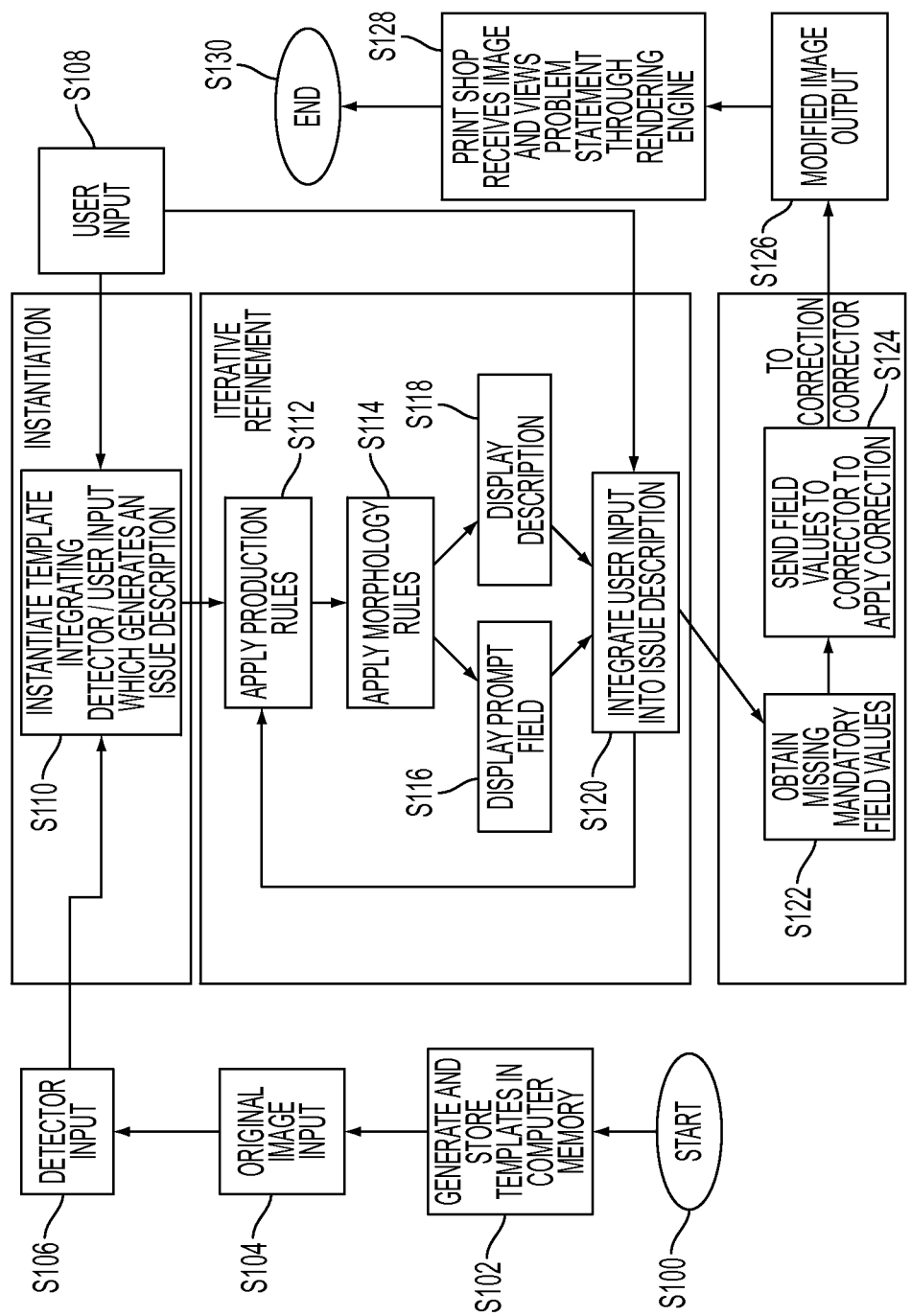
FIG. 4 is a flow diagram illustrating one embodiment of a color management method.

The method illustrated in FIG. 4 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method for specifying a color problem with an image and an appropriate solving process for correcting the problem.

Without intending to limit the scope of the exemplary embodiment, the following Example illustrates a problem specification and solving process.

EXAMPLE

An example of a problem specification and solving process is illustrated in the screenshots shown in FIGS. 5 and 7-10 in the context of a print mediator as described in application Ser. No. 12/138,846. Not all the details of the underlying template (i.e., its complete structure with all associated options and rules) and its execution process are shown, for convenience. Rather, the screen shots are intended to illustrate various aspects of the interaction.

In this example, an automatic detector 16 has detected that the color of (a) graphics component(s) 84 of the document cannot be appropriately reproduced because it is out of the printer's gamut. Thus, instead of the original color, the color produced constitutes a 'compromise' mapping of the original color into the printer's color space. In the present case, assume that the concerned color is a corporate color and an appropriate reproduction is therefore of great importance.

The corresponding template 28 with the following interaction structure is instantiated by the detector:

[NumericParameters]

article [object] [property] being [variation] because [cause].

[DoesItMatter] [WhyItMatters].

Therefore it is [priority] to correct.

Apply [correction method] to [target] or [specify requirements for print shop].

In the above simplified representation of the template, the field nodes are represented between brackets and each field 92, etc has different options. The [NumericParameters] field contains a numeric description of the detected color change filled in by the detector. The field [object] may have as its value one or more of graphic, picture, text, or element. The field [priority] can have as a value: mandatory, important or desirable. Some rules define the conditional visibility of the different fragments (sentences) and the corresponding fields, and others the way the proposed correction options depend on the field values: [object], [property], [cause] and [WhyItMatters].

When instantiating the template, the detector 16 will provide some value for the fields object, property, variation and cause. The remaining fields are filled with their default values, if any. Then, the template rules are applied: they hide the last sentences of the problem description text 102 and propagate the features of the actually filled field values in order to enable the construction of syntactically correct sentences. This results in the following (first) dialog with the user (FIG. 5), describing the problem and prompting him to decide if it matters or not. As shown in FIG. 5, a first part of the problem description 102 (The graphic's red will print less intense and darker than in the original because it is out of the printer gamut . . . ) is presented in the issue editor box 104 and the description editor pop up box 122 is also displayed, which shows possible options for the field [does it matter], which may be highlighted, e.g., in a different color or in bold, in the displayed part of the problem description. The user can actuate the mouse 66 to control the cursor and click on one of the options presented.

If the user now selects that It does not matter, the problem state is set to ignored and the process and the corresponding interaction is closed. In the illustrated scenario, the problem matters and the user selects It matters. He is prompted immediately for a reason: [WhyItMatters], as shown in the screen shot in FIG. 7. Here a new description editor pop up box 122 displays the selectable options for why it matters.

Figure 8:
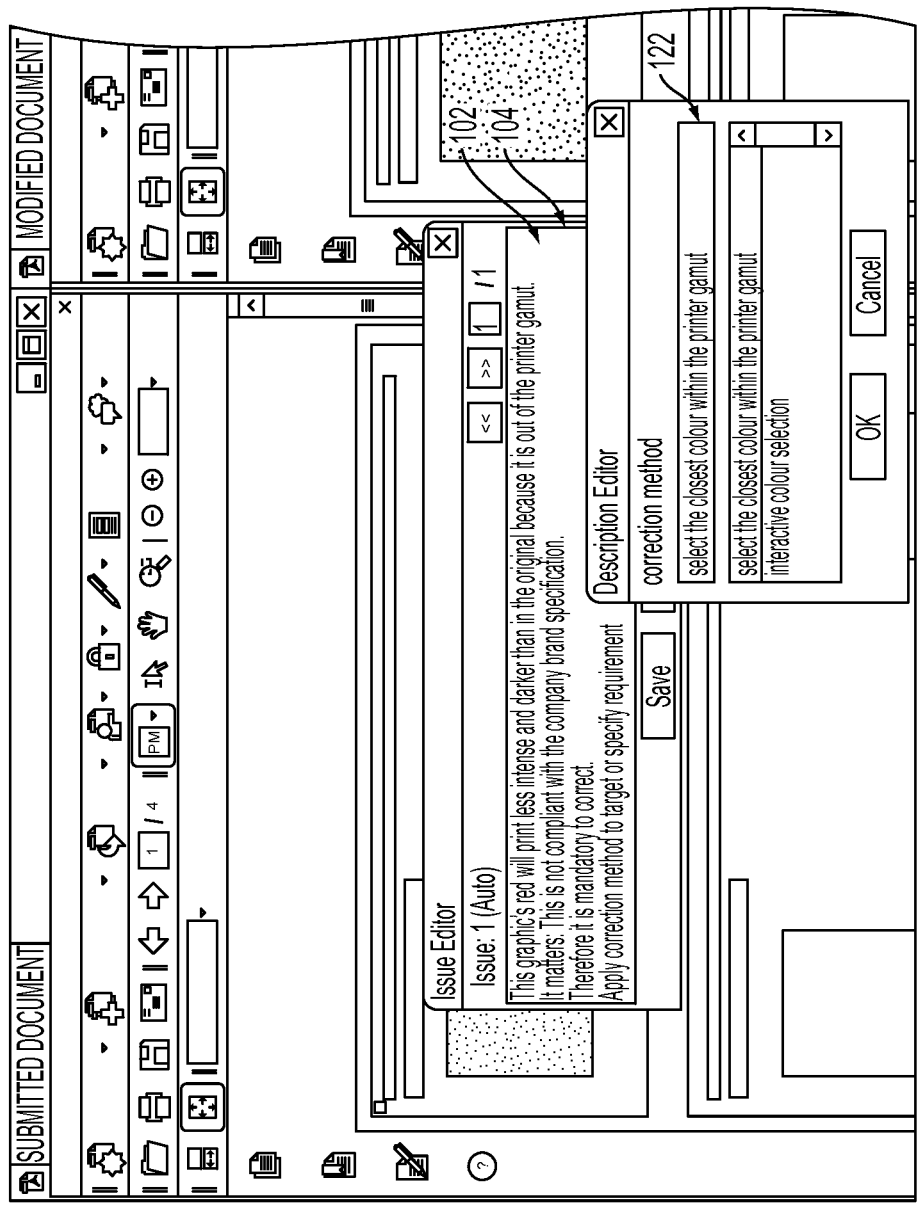
FIG. 8 illustrates another screenshot of the exemplary interface display presented to a user.

In the present case, the designer selects the option This is not compliant with the company brand specification. This means that the problematic color is key and that the problem is really important. A corresponding rule thus sets the value of the [priority] field to mandatory. Another rule adjusts the scores associated to the [correction method] options that allow selection and enacting of a correction method. The score associated to the option Select the closest color within the printer gamut is set to 1 (the highest possible score) while the score associated to the option Interactive color selection is set to a lower value. Indeed, as the color is a company color it should be matched as closely as possible and the corresponding correction option is more likely to be the most appropriate; an interactive color selection (e.g., allowing for a selection that takes into account both the how close the color is in Euclidian distance and the direction of the selection in the color space mapping) would be less likely to be appropriate in this case. The display is then updated as shown in FIG. 8.

Figure 9:
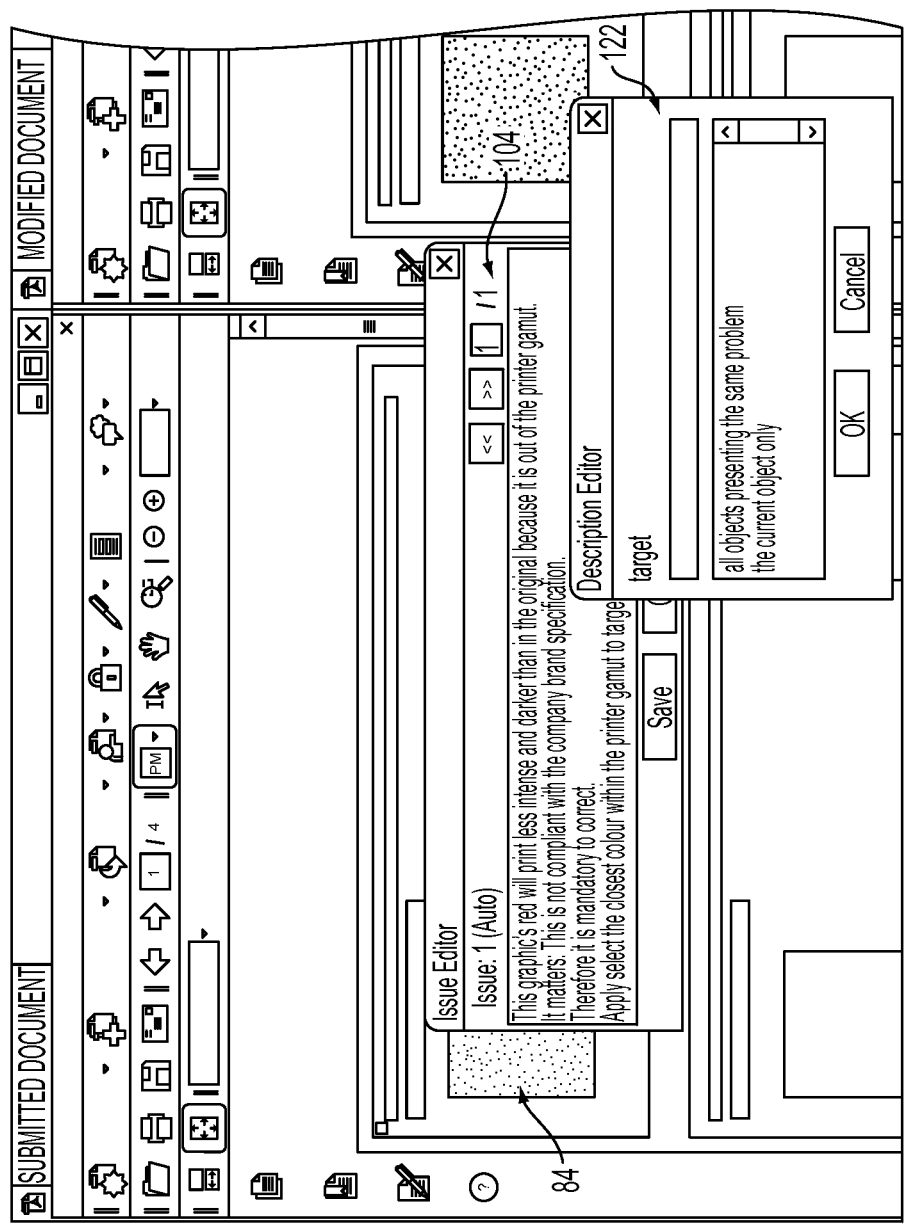
FIG. 9 illustrates another screenshot of the exemplary interface display presented to the user.

The user now chooses to edit the [correction method] field. Through the interface the designer selects the top ranked option Select the closest color within the printer gamut. The correction is activated and the user is asked to provide the value of the mandatory [target] field (FIG. 9).

This field specifies if the correction should be applied to all objects within the document presenting the same problem or to the current object only. The user selects the second option. As a consequence, the corresponding corrector 22 is launched and modifies the color of the corresponding object 84. It is provided with all the template field values to apply the correction, including the ones filled by the user as well as the ones filled by the detector, in particular the [NumericParameters].

Figure 10:
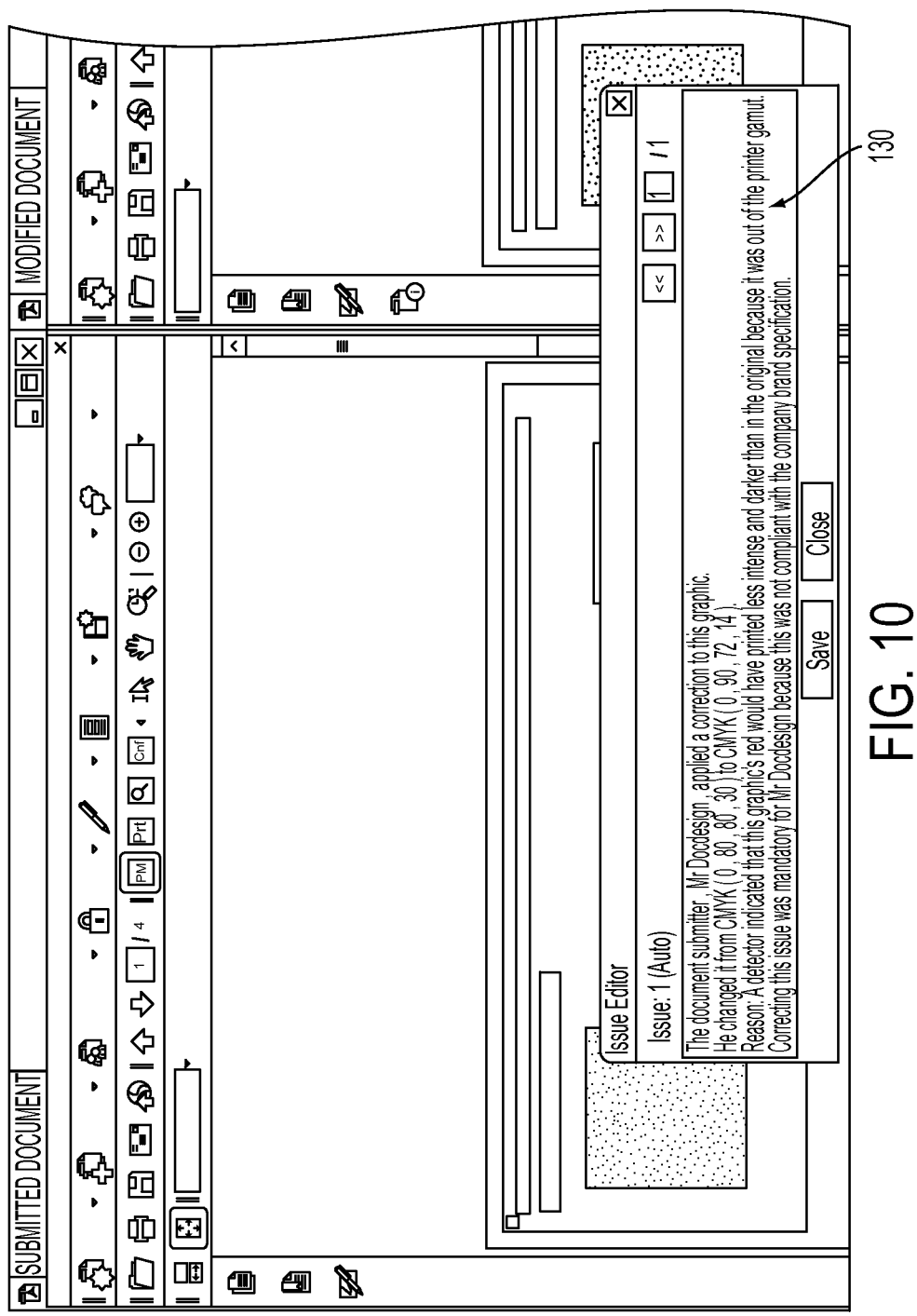
FIG. 10 illustrates another screenshot of the exemplary interface display presented to the user.

If the user is satisfied with the correction obtained, he will accept the it and the problem state is set to solved. Once the modified document 48 is received at the print shop, the corresponding annotation 130 is visible to the print shop operator who can consult it to get information about the actions carried out by the document designer. FIG. 10 shows how the template instance is interpreted to present the appropriate information to the print shop operator.

As will be appreciated, the same type of process may be repeated for other objects in the document which raise problems, with the same or a different template model being instantiated, as appropriate.

In the example, it is presumed that the designer can solve the problem using the correction tools available. If this is not the case, i.e., if the designer was not satisfied with the modifications obtained by applying the proposed correction method(s), the designer would reject the applied corrections. In this case, provision is made for the designer to specify requirements for the print shop, for example, in free text form, using an annotation box which may pop up automatically, if the user rejects the correction. The designer could, for example, specify that the overall color harmony of the page containing the problematic element is essential and that any correction must preserve it. This requirement would then be stored within the template instance and the document 48. Once the document is submitted to and received at the print shop, the print shop operator can examine this open issue and try to solve it (perhaps by applying additional correction methods available on the print shop side, which are not available to the user) and immediately checking that the printout respects the designer's requirements.

Template Specification Process

In addition to providing for an issue description to be elaborated from the input of a specific detector up to the triggering of a corrector using a corresponding template, the exemplary system can manage several detectors, correctors and templates in a generic way. It can also be extended with new instances of them.

The exemplary templates 28, 30, 32 are problem specific, i.e., they specify the information needed to both characterize the problem and to correct it. Furthermore, they specify how this information is presented to the user and how the user can contribute to successively elaborate the problem and enact its correction. In principle, several correctors 22, 24, 26 and detectors 16, 18, 20 can be associated to each individual problem. The corresponding template specifies how they connect to each other and also how to make them accessible and understandable by the user.

When a new type of problem detector is available, an integrator (the person in charge of its integration into the system) has two options:

1. If the new type of problem detected can be described using an existing template, the integrator will first update the template by adding, for example, new options to some fields specific to this newly detected problem and new rules associated to these values. The integrator will then link the detector to the existing template and implement the mapping of the output of the detector with the fields of the template.

2. If the new type of problem detected has a very different kind of issue description than the ones supported by existing templates, the integrator will need to create a template specific to this type of problem. The integrator will then need to link the detector to the new template as with the first option.

When a new problem corrector is available, the integrator will first identify, within the existing templates, which ones support the elaboration of problem descriptions that could be solved by this corrector. The integrator will then update each of the identified templates adding at least one actionable field option that corresponds to the corrector, and potentially some additional fields that will be used as arguments for the corrector, and finally the corresponding rules for these new fields and options.

The benefit of the use of templates is that it provides a system that is not simply providing a natural language interface to one sort of detection/correction tool but one that is generic to any kind of problem that can be detected and any kind of correction that can be proposed. The interface can be of particular use in situations where the user needs to be guided in a readily understandable (non-technical) manner to encode actionable selections, where the technical specifics of the detection and correction are of less use to the user (i.e., impenetrable) than the manifested visual effects of those changes.

Semi-automatic text generation systems are available which propose a generic approach to generate, step by step, grammatically correct natural language text. The present system also has a generic approach to text generation but its aim is not to generate this text in itself but to use it to enable the user to interact with the underlying detectors and correctors. The guided natural language interface combines semi-automated text generation with user input, allowing a user to handle the problem solving process on a higher level but enabling the interaction with underlying complex problem detectors and correctors.

The system thus described may find application in combination with one or more of the following:

1 A Print Mediator as described in application Ser. No. 12/138,846. The print mediator mediating between a document submitter and a print shop operator with the aim of quickly obtaining an acceptable version of the printed document. Print Mediator enables a comparative review between the appearance of a document as displayed on a computer screen and a soft proof i.e. a simulation of its printed appearance. Print Mediator's functionalities include, furthermore, semi-automatic problem detection and correction. It therefore integrates color problem detector and corrector components. The aim is to enable print shop clients, prior to document submission, to detect existing color problems within their document, to annotate problematic regions with recommendations for the print shop operator or even to solve such problems if possible. The print mediator can be adapted to provide the present guided natural language interface 10 to support the problem specification and solving process. The technical complexity of the underlying color problem detector and corrector components which cannot be easily used by the document designers (and are also not well understood in a number of print shops) are thus presented and selectable in a user friendly manner. Document designers are thus able to interact with these components through a guided natural language interface layer supporting the problem specification and solving process. This method bridges the gap between the level of comprehension of print shop clients (document designers being none-experts in the very technical domain of color management) and the underlying (rather complex) problem detector and corrector components. The method, furthermore, takes into account the fact that the same print mediator can be used by both designer and print shop operator, i.e., by users with different levels of expertise in relation to Color Management but also different orientations and competencies. It provides both with different yet appropriate templates through corresponding interface structures that are adapted to these different levels of expertise.

2. A natural language color editing system, as described for example, in U.S. Pub. No. 2008/0007749 and in Woolfe, G., Maltz, M., Natural Language Color Editing, Proc. XIG Conference, pp 122-125 (2006). Such a system translates natural language descriptions of color transforms into actual mathematical color space transforms. This technique may be integrated in some correctors in order to interpret some field values captured by the interface when interacting with the user and that relate to a color transform.

3. A natural language soft proofing system, as described for example in above-mentioned U.S. patent application Ser. No. 12/464,212. Such a system describes, in natural language, the expected color changes when computing and displaying a document soft proof. This technique may be integrated with some detectors when filling in initial template fields that relate to color changes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A color management system comprising:
a non-transitory computer readable memory which stores a guided natural language interface, the guided natural language interface comprising a set of issue description templates, each of the issue description templates being configured for guiding a user in formulating a problem statement, the user-formulated problem statement characterizing, in natural language, a perceived problem related to color identified in an input document and color of the input document when rendered on an associated printer; and
a plurality of automated problem detectors which operate on an input document, each of the automated problem detectors being configured for automatically identifying a respective color-related problem when there is an expected difference in color between the input document and color of the input document when it is rendered using characteristics of a specific printer, each detector being configured to provide input to the guided natural language interface when the detector detects the color-related problem for the input document, the detector input specifying one of the set of issue description templates or being used for partially filling in one of the issue description templates based on the identified color-related problem;
the guided natural language interface further comprising a natural language rendering engine, executed by a processor, which is configured for receiving information input by at least one of the user and at least one of the problem detectors, and which instantiates one of the issue description templates in response to receiving the information input by the at least one of the user and the at least one problem detector, the natural language rendering engine configured for presenting the problem statement and accepting user input to refine the problem statement in accordance with options provided from the instantiated template, and communicating information based on the refined problem statement to an associated color management problem corrector.

2. The system of claim 1, wherein each of the templates includes an issue description related to a different problem, the issue description including an ordered arrangement of nodes including field nodes, each field node corresponding to a field, at least some of the fields being fillable by a user and at least some of the fields being fillable by the at least one problem detector, the issue description further including production and morphological rules, the production rules each modeling how the value of one of the nodes influences at least one other of the nodes, the morphological rules each describing a syntactic relationship between at least two of the nodes.

3. The system of claim 2, wherein the field nodes are interactive nodes in which text content of the field nodes is filled or modified in response to inputs by at least one of the user and a problem detector.

4. The system of claim 2, wherein the nodes of the issue description further include text nodes which support the generation of syntactically correct text strings in the problem statement, in which text content of the text node is filled or modified in response to features of other nodes wherein the problem statement is based on the content of at least some of the field nodes and text nodes.

5. The system of claim 2, wherein the set of nodes further includes at least one fragment nodes, each fragment node including a sequence of child nodes selected from field nodes, text nodes, optionally smaller fragment nodes, and combinations thereof, each fragment node corresponding to a displayable fragment of the issue description.

6. The system of claim 2, wherein at least some of the nodes comprise linguistic features including at least one feature selected from:
 a) gender; and
 b) singular or plural.

7. The system of claim 2, wherein each production rule models a dependency between a first of the nodes and a second of the nodes, whereby a change to the first node affects the second node.

8. The system of claim 7, wherein the second node is able to be affected in at least one of:
 i. a change in the visibility of content of the second node, where the second node is a fragment node;
 ii. a modification in a value or a default value of content of the second node, where the second node is a field node;
 iii. a requirement to add or remove an option to or from a field of the second node, where the second node is a field node;
 iv. a modification to a list of available displayable options for a field;

v. a setting of a score associated to a given option in a field which enables a modification of an order in which options for the field are displayed;

vi. a modification to a state of the issue description, the issue description being capable of being in one of a plurality of states including a detected state, an open state, an ignored state, and a solved state; and vii. a specification of a complementary description field to present to the user.

9. The system of claim 2, wherein each of the issue description templates includes a set of morphology rules, each morphology rule describing a syntactic relationship between at least two of the nodes.

10. The system of claim 1, wherein the instantiated template includes a plurality of field nodes, each of the plurality of field nodes listing a plurality of user selectable options displayable to a user.

11. The system of claim 1, wherein the rendering engine causes an associated display to display:

at least one of the input document and a modified document, based on the input document, to which a correction has been applied; and the problem statement as it is refined.

12. The system of claim 1, wherein the plurality of detectors includes a plurality of detectors selected from the group consisting of:

a detector which automatically detects a mismatch in the rendering of a group of image objects which are of similar color in the image;

a detector for automatically detects when a color profile is missing for an object; and a detector which automatically detects a difference between spot color definitions used for the image and corresponding spot color definitions used by a selected rendering device.

13. A color management system comprising:

a non-transitory computer readable memory which stores a guided natural language interface, the guided natural language interface comprising a set of issue description templates, each of the issue description templates being configured for guiding a user in formulating a problem statement, the user-formulated problem statement characterizing, in natural language, a perceived problem related to color identified in an input document and color of the input document when rendered on an associated rendering device, and a set of at least two problem detectors communicatively linked to the interface; and a set of at least two problem correctors communicatively linked to the interface;

the guided natural language interface further comprising a natural language rendering engine, executed by a processor, which is configured for receiving information input by at least one of the user and at least one of the problem detectors, and which instantiates one of the issue description templates in response to receiving the information input by the at least one of the user and the at least one problem detector, the natural language rendering engine configured for presenting the problem statement and accepting user input to refine the problem statement in accordance with options provided from the instantiated template, and communicating information based on the refined problem statement to at least one of the problem correctors;

at least one of the problem detectors being configured for automatically identifying color-related problem when there is an expected difference in color between the input document and color of the input document when it is rendered using characteristics of an associated rendering device, to provide input to the guided natural language interface when a detector detects the color-related problem for the input document, the detector input specifying one of the set of issue description templates or being used for partially filling in one of the issue description templates based on the identified color-related problem; and each of the problem correctors being configured for correcting an expected problem related to color when the input document is rendered on the associated rendering device, based on the communicated information.

14. The color management system of claim 13, further comprising a display communicatively linked to the guided natural language interface which displays a prompt field for a user to select a value for the field and displays a problem statement based on the selected value.

15. The system of claim 13, wherein the detectors include at least one of the group consisting of:

a detector which automatically detects a mismatch in the rendering of a group of image objects which are of similar color in the image;

a detector for automatically detecting an out of gamut color of an image object;

a detector which automatically detects when a color profile is missing for an object; and a detector which automatically detects a difference between spot color definitions used for the image and corresponding spot color definitions used by a selected rendering device.

16. The system of claim 13, wherein for each of the detectors, a corresponding at least one of the correctors is configured for correcting a problem detected by the detector.

17. A color management method comprising:

storing a plurality of issue description templates in computer memory, each of the issue description templates being configured for guiding a user in formulating a problem statement, the user-formulated problem statement characterizing, in natural language, a perceived problem related to color identified in an input document and color of the input document when rendered on an associated rendering device, each of the issue description templates including an issue description related to a different problem, the issue description including an ordered arrangement of nodes including field nodes corresponding to a plurality of fields, at least some of which are fillable by a user, and production and morphological rules, the production rules modeling how values of nodes influence other nodes for propagating features of filled fields of the issue description to one or more other fields of the issue description, the morphological rules each describing a syntactic relationship between at least two of the nodes;

receiving an input document;

providing for input from a problem detector configured for automatically identifying a problem when there is an expected difference in color between the input document and color of the input document when it is rendered using characteristics of an associated rendering device;

with a processor, instantiating one of the issue description templates based on information from at least one of the detector and a user concerning a problem related to color identified in the input document;

iteratively refining a problem statement, comprising:

presenting at least one of the fillable fields to a user and integrating user selected content of the filled fields;

applying the production rules; and
applying the morphological rules;
thereby generating a refined problem statement in natural language form; and
determining a correction to be applied to the image based on the refined problem statement.

18. The method of claim 17, wherein the issue description nodes include text nodes which support generation of syntactically correct text strings in the problem statement, in which text content of the text node is filled or modified in response to features of other nodes.

19. The method of claim 17, further comprising communicating the determined correction to a selected one of a plurality of associated correctors for correction of the image.

20. The method of claim 19, wherein the corrected image is rendered on a display.

21. The method of claim 17, further comprising applying the correction to the image and outputting a corrected image.

22. The method of claim 17, wherein the features include at least one of gender features and features which are one of singular and plural.

23. The method of claim 17, further comprising annotating the image with the problem statement.

24. The method of claim 17, further providing for another user to review the problem statement through a rendering engine, the rendering engine adapting displayed content of the problem statement to each user's competence level.

25. The method of claim 17, further comprising, providing for a user to select a competence level from a plurality of competence levels, the competence level affecting content of the displayed problem statement.

26. A computer program product encoding instructions stored on a non-transitory computer readable medium which, when executed by a computer, performs the method of claim 17.

27. A color management system comprising:
a non-transitory computer readable memory which stores a plurality of templates, each of the templates configured for guiding a user in formulating a problem statement, the user-formulated problem statement characterizing, in natural language, a perceived problem related to color identified in an input document and color of the input document when rendered on an associated rendering device and comprising:
an issue description related to a respective problem, the issue description comprising an ordered arrangement of nodes including:
field nodes corresponding to a plurality of fields, at least some of the field nodes being fillable based on user-selected content and at least some of the fields being fillable based on information provided by an associated detector, the detector being configured for automatically identifying a problem when there is a difference in color expected between the input document and color of the input document when it is rendered using characteristics of the associated rendering device;

text nodes which support the generation of syntactically correct text strings in the problem statement, in which text content of the text node is filled or modified in response to features of other nodes; and optionally, fragment nodes, each of which contains a list of child nodes selected from the field nodes, the text nodes, and optionally other fragment nodes;

production rules which each model how a value of one of the nodes influences at least one other of the nodes; and morphological rules each describing a syntactic relationship between at least two of the nodes;

a plurality of automated problem detectors which operate on an input document, each of the automated problem detectors being configured for automatically identifying a respective color-related problem when there is an expected difference in color between the input document and color of the input document when it is rendered using characteristics of a specific printer, each detector being configured to provide input to a natural language rendering engine when the detector detects the color-related problem for the input document, the detector input specifying one of the set of issue description templates or being used for partially filling in one of the issue description templates based on the identified color-related problem; and the natural language rendering engine, executed by a processor, which is configured for receiving information input by at least one of the user and at least one of the problem detectors, and which instantiates one of the issue description templates in response to receiving the information input by the at least one of the user and the at least one problem detector, the natural language rendering engine configured for presenting the problem statement and accepting user input to refine the problem statement in accordance with options provided from the instantiated template, and communicating information based on the refined problem statement to an associated color management problem corrector.

* * * * *